United States Patent
Jarach

(10) Patent No.: US 6,570,838 B1
(45) Date of Patent: May 27, 2003

(54) OPTICAL COMPACT DISC WITH AN INCREASED MEMORY CAPACITY

(75) Inventor: Andrea Jarach, Milan (IT)

(73) Assignee: ATOP Innovation S.p.A. (IT)

( * ) Notice: Subject to any disclaimer, the term of this patent is extended or adjusted under 35 U.S.C. 154(b) by 0 days.

(21) Appl. No.: 09/615,559

(22) Filed: Jul. 13, 2000

(30) Foreign Application Priority Data

Nov. 29, 1999 (IT) .................................. RM990248 U

(51) Int. Cl.$^7$ .................................................. G11B 7/24
(52) U.S. Cl. ................. 369/275.3; 369/53.2; 369/44.26
(58) Field of Search .......................... 369/275.1, 275.3, 369/275.4, 275.2, 13, 277, 278, 279, 44.26, 53.2, 53.3, 53.37, 47.39, 44.13, 44.27, 44.29, 47.4, 124.07

(56) References Cited

U.S. PATENT DOCUMENTS

| | | | | |
|---|---|---|---|---|
| 5,521,895 A | * | 5/1996 | Miura et al. ................... | 369/50 |
| 5,708,649 A | * | 1/1998 | Kamoto et al. .......... | 369/275.3 |
| 6,075,670 A | * | 6/2000 | Stan et al. ................ | 360/73.03 |
| 6,147,961 A | * | 11/2000 | Nagasawa et al. ....... | 369/275.3 |
| 6,345,024 B2 | * | 2/2002 | Sugasawa et al. ......... | 369/53.2 |

FOREIGN PATENT DOCUMENTS

| | | |
|---|---|---|
| EP | 0 426 872 A1 | 5/1991 |
| EP | 0 527 602 A2 | 2/1993 |
| EP | 0 978 830 A1 | 2/2000 |

* cited by examiner

*Primary Examiner*—Ali Neyzari
(74) *Attorney, Agent, or Firm*—Pennie & Edmonds LLP

(57) ABSTRACT

The present invention relates to an optical compact disc, on which data in a binary digital format are physically memorized as pits and lands of the disc surface along a spiral-shaped track running all along the surface of the disc. The track is scanned, during the data reading phase by the reading optical apparatus with a constant linear velocity (CLV). The track has at least one of first and second portions. The first portion of the track is scanned, during the data reading phase, with a CLV of between about 0.1 m/s and 1.2 m/s. The second portion of the track comprises a constant track pitch of between about 1.3 μm and 1.6 μm.

9 Claims, 1 Drawing Sheet

OPTICAL COMPACT DISC WITH AN INCREASED MEMORY CAPACITY

FIELD OF THE INVENTION

The present invention relates to an improved optical compact disc (CD). More particularly, the present invention relates to a CD that can be read and/or written by suitable electronic apparatuses to memorize data, that allows a higher memory capacity, and that increases the difficulties in copying the memory contents onto other writable or re-writable CD by unauthorized users.

BACKGROUND OF THE INVENTION

It is well known how the use of optical supports for the memorization of data is extremely diffused. Particularly, for exemplificative but not limitative purposes, audio digital (DA) or only readable (CD-ROM) or only once writable (CD-R OR CD-WORM) or re-writable (CD-RW) compact discs (CD) are widely used in musical, video, and photo industries as well as in software field.

Compact discs typically have a circular shape with an axial hole. They can be read and/or written by specific apparatus that have a CD rotation mechanism interacting with the axial hole and with laser optical devices. The housings of the apparatus within which CDs are introduced typically have a circular shape and are dimensioned corresponding to the CDs to be housed. Particularly, within the housings, a plurality of concentric seats can be provided, corresponding to the standard dimensions of the various kinds of CDs.

Data, with a binary digital format, are physically memorized on CDs as pits and lands on the surface of the disc along a spiral-shaped track running all along the surface of the same disc. Reading optical apparatuses generate a laser beam that is focused on the track and reveal by a photodetector the amount of light reflected by the surface of the disc. The amount of light reflected varies depending on whether it comes from a pit or a land.

The physical features of all conventional CDs are substantially the same and formed according to international standard defined on 1982. Particularly, the standard has been defined in function of specific writing and reading modes of the optical apparatuses interacting with the CD.

The spiral-shaped track of the memorized data on a CDROM is scanned by the optical reading apparatus with a constant linear scanning velocity (CLV), the value of which is defined by the standard as included in the range between 1.2 and 1.4 m/s.

The international standard also defines the distance between two contiguous involutions of the spiral-shaped track, also known as "track pitch", that must be of 1.6 $\mu$m.

Furthermore, the international standard sets that all the CDs provide the presence of nine sections of the track, each of them containing specific information, identified as nine areas having a circular crown on the optically active surface of the disc. The following table lists the nine sections, with the relevant name and the radial distance from the center of the disc to the beginning of the section:

| Section | Radial Distance ($\mu$m) |
| --- | --- |
| Continuous Track Inside | 18000 |
| Master ID Number | 18700 |
| Test Signal Inside | 21700 |
| Lead In | 23500 |
| Program Area | 24400 |
| First Lead Out | 56700 |
| Development Band | 58000 |
| Test Signal Outside | 59000 |
| Continuous Track Outside | 59600 |

The organization of the disc track maintains the initially planned division for the audio digital CD.

However, the physical features of CD set by the international standard has some drawbacks. First of all, memory capacity is limited by the high values of CLV and by the track pitch. Further, outer sections of the track starting from the First Lead Out are not used by CD-ROM, thus obtaining a further reduction of the real memory capacity with respect to the potential one.

Finally, since the standard is rigidly fixed for any kind of CD, using a once writable CD (CD-R or CD-WORM) or a re-writable CD (CD-RW), it is easy also for an unauthorized user to make a copy of an audio CD or of a CD-ROM.

SUMMARY OF THE INVENTION

Therefore, the object of the present invention is to provide a simple and reliable CD that has a higher memory capacity and that can not be copied on the conventional once writable CD (CD-R or CD-WORM) or re-writable CD (CD-RW).

It is therefore another object of the present invention to provide an improved optical CD, on which the data, with a binary digital format, are physically memorized as pits and lands of the disc surface along a spiral-shaped track running all along the surface of the disc. The track is scanned, during the data reading phase, by a reading optical apparatus with a constant linear velocity (CLV). The CD can comprise at least a first portion of the track that is scanned, during the data reading phase, with a CLV of between about 0.1 m/s and 1.2 m/s, preferably between about 0.9 m/s and 1.2 m/s. The CD can comprise at least a second portion of the track wherein the consecutive involutions of the spiral are separated by a constant track pitch of between about 1.3 $\mu$m and 1.6 $\mu$m, preferably of 1.4 $\mu$m.

Always according to the invention, the first portion of the track can be the whole the track.

Still according to the invention, the second portion of the track can be the whole track.

Furthermore, according to the invention, the first portion of the track and the second portion of the track can be at least partially overlapped.

Always according to the invention, the spiral-shaped track can comprise at least five sections, preferably five sections. The beginning of the first five sections can have a radial distance from the center of the disc of 18000 $\mu$m, 18700 $\mu$m, 21700 $\mu$m, 22500 $\mu$m and 23400 $\mu$m, respectively.

Preferably, according to the invention, the optical compact disc is an only readable CD, or a CD-ROM.

DETAILED DESCRIPTION OF THE INVENTION

Figure 1:
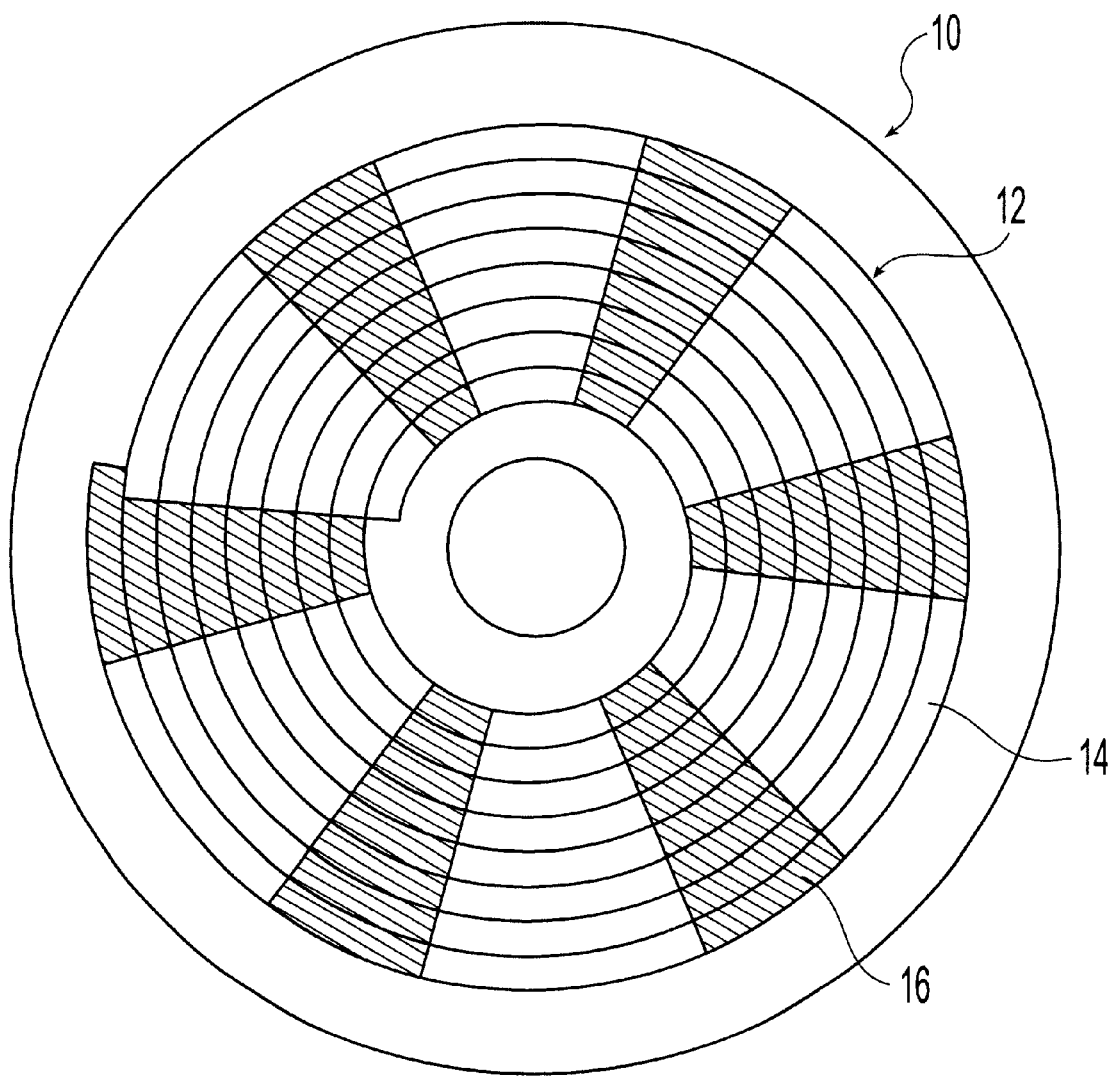
FIG. 1 is a plane view of a compact disc showing pits and lands.

The present invention will be now described, for illustrative but not limitative purposes, according to one preferred embodiment.

As mentioned above, a reading optical apparatus detects by a photo-detector the amount of light reflected by the disc surface. The amount of light is different depending on whether the light comes from a pit or from a land.

Compact discs 10 according to the invention provides that the reading mode is not modified, but that the track 12 is scanned, at least in a portion of the same, by a constant linear velocity (CLV), having a value lower than the standard value, and that pits 14 and lands 16 have a consequently reduced length. In this way, the amount of light reflected detected by the photo-detector for each pit/land is not modified. The amount of information memorized on the disc 10 is higher than that of a CD made according to the international standard.

The preferred embodiment of the CD 10 according to the invention provides that in the track portions with a lower reading velocity, a CLV is provided between about 0.9 m/s and 1.2 m/s. Consequently, pits 14 and lands 16 have a reduced length comparing to that of a CD made according to the international standard.

Supposing a uniform CLV of 0.9 m/s is adopted all along the CD track, a memory capacity increase of 25% is obtained comparing to a CD scanned at the standard CLV of 1.2 m/s.

In other embodiments, the CLV can be between about 0.1 m/s and 0.9 m/s.

According to the CD 10 of the invention, the involutions of the spiral-shaped track 12, at least in a portion thereof, are closer to each other comparing to those in a CD formed according to the international standard. Particularly, the invention provides that the track pitch in the portion with closer involutions is between about 1.3 $\mu$m and 1.6 $\mu$m. In a preferred embodiment, the track pitch is about 1.4 $\mu$m.

Supposing a uniform track pitch of 1.4 $\mu$m is adopted all along the CD track, a memory capacity increase of 12.5% can be obtained comparing to a CD having the standard track pitch of 1.6 $\mu$m.

Writable or re-writable CDs (CD-R or CD-WORM and CD-RW) have physical limitations as to the minimum length of pits/lands and the minimum track pitch obtainable on their surface. Therefore, the memory capacity of such CDs cannot be higher than a maximum value that is lower than the value of the CD according to the invention that therefore cannot be copied.

In other embodiments of the CD according to the invention, the radial distance of the fourth section of the track, called Lead In, is of 22500 $\mu$m, and that the radial distance of the fifth section of the track, called Program Area, is of 23400 $\mu$m, with a consequent increase of 1 mm of the Program Area, wherein the significative data are memorized.

In further embodiments, in particular for the CD-ROM, CDs can have only the first five sections, (Continuos Track Inside, Master ID number, Test Signal Inside, Lead In, Program Area) set by the international standard, thus obtaining a further extension of the fifth section.

The modification of the length of pits 14 and lands 16 and of the track pitch distance and of the number of sections along the track 12 occurs on the mold used during the mass-production of the CD 10 according to the invention, without any modification of the apparatuses and of the existing manufacturing modes.

The CDs 10 according to the invention are readable by the existing optical reading apparatuses. But, as discussed above, the CDs 10 of the present invention cannot be integrally copied on the present writable or re-writable CD.

The present invention has been described for illustrative but not limitative purposes, according to its preferred embodiments, but it is to be understood that modifications and/or changes can be introduced by those skilled in the art without departing from the relevant scope as defined in the enclosed claims.

What is claimed is:

1. An optical compact disc, on which data in a binary digital format are physically memorized as pits and lands of the disc surface along a spiral-shaped track running all along the surface of the disc, said track being scanned, during the data reading phase by the reading optical apparatus with a constant linear velocity (CLV);

wherein said track is scanned, during the data reading phase, with a CLV of about 0.1 m/s to less than 1.2 m/s; and wherein said track comprises a constant track pitch of about 1.3 $\mu$m to less than 1.6 $\mu$m.

2. The optical compact disc according to claim 1, wherein said track is scanned, during the data reading phase, with a CLV of about 0.9 m/s to less than 1.2 m/s.

3. The optical compact disc according to claim 1, wherein said track has a constant track pitch of 1.4 $\mu$m.

4. The optical compact disc according to claim 1, wherein the spiral-shaped track comprises at least five sections, the beginning portions of the first five sections having a radial distance from the disc center of 18000 $\mu$m, 18700 $\mu$m, 21700 $\mu$m, 22500 $\mu$m, and 23400 $\mu$m, respectively.

5. The optical compact disc according to claim 1, wherein the spiral-shaped track comprises five sections.

6. The optical compact disc according to claim 1, wherein the optical compact disc is a readable CD or CD-ROM.

7. The optical compact disc according to claim 1, wherein said track is scanned, during the data reading phase, with a CLV of about 0.9 m/s to less than 1.2 m/s.

8. The optical compact disc according to claim 1, wherein said track has a constant track pitch of 1.4 $\mu$m.

9. An optical compact disc, on which data in a binary digital format are physically memorized as pits and lands of the disc surface along a spiral-shaped track running all along the surface of the disc, said track being scanned, during the data reading phase by the reading optical apparatus with a constant linear velocity (CLV), said track comprising first and second portions;

wherein the first portion of the track is scanned, during the data reading phase, with a CLV of about 0.1 m/s to less than 1.2 m/s; and wherein the second portion of the track comprises a constant track pitch of about 1.3 $\mu$m to less than 1.6 $\mu$m.

* * * * *